United States Patent [19]
Borland

[11] Patent Number: 5,511,576
[45] Date of Patent: Apr. 30, 1996

[54] PISTON-TYPE THERMALLY ACTIVATED RELIEF DEVICE

[75] Inventor: Robin N. Borland, McMurray, Pa.

[73] Assignee: Amcast Industrial Corporation, Dayton, Ohio

[21] Appl. No.: 373,622

[22] Filed: Jan. 17, 1995

[51] Int. Cl.⁶ ................................................ F16K 17/38
[52] U.S. Cl. ................................................ 137/72; 137/79
[58] Field of Search ........................................ 137/22, 79

[56] References Cited

U.S. PATENT DOCUMENTS

| | | |
|---|---|---|
| 2,671,461 | 3/1954 | Hebert . |
| 3,896,835 | 7/1975 | Wicke . |
| 4,221,231 | 9/1980 | Harvey et al. . |
| 4,273,251 | 6/1981 | McMahon ............................ 137/72 X |
| 4,365,643 | 12/1982 | Masclet et al. ....................... 137/72 X |
| 4,503,675 | 3/1985 | Gardner et al. . |
| 4,553,589 | 11/1985 | Jennings et al. . |
| 4,744,382 | 5/1988 | Visnic et al. . |
| 4,744,383 | 5/1988 | Visnic et al. . |
| 4,800,948 | 1/1989 | Visnic . |
| 5,197,671 | 5/1993 | Wass et al. . |
| 5,223,347 | 6/1993 | Lhymn et al. . |
| 5,255,809 | 10/1993 | Ervin et al. . |

*Primary Examiner*—John C. Fox
*Attorney, Agent, or Firm*—Killworth, Gottman, Hagan & Schaeff

[57] ABSTRACT

A thermally activated relief device which resists extrusion-related failures even at high pressures and yet reliably activates to relieve pressure in a vessel and to prevent a catastrophic pressure rupture of a vessel is provided. The thermally activated relief device includes a body having an inlet, an outlet, and a fluid flow passage communicating with the inlet and outlet. The body further includes a fluid escape passage having a member therein which is porous to gases and liquids but not to solids. A plug of a fusible material which melts at a predetermined temperature is positioned adjacent to the porous member and normally seals the fluid escape passage. A piston is normally biased into a sealing relationship with the inlet, but, when the fusible plug melts, moves upwardly to open the flow passage and relieve fluid pressure.

15 Claims, 4 Drawing Sheets

PISTON-TYPE THERMALLY ACTIVATED RELIEF DEVICE

BACKGROUND OF THE INVENTION

The present invention relates to thermally activated relief devices which are activated to relieve pressure in pressurized containers when a predetermined temperature in or around the container is exceeded.

Most vessels or containers containing a gas or liquid under pressure are equipped with relief valves to prevent catastrophic rupture of the vessels in the case of excessive pressures or temperatures. For example, vehicles using alternative fuels such as compressed natural gas (CNG) require the presence of one or more fuel cylinders on board containing such gas under pressure. Federally mandated regulations require that such cylinders be equipped with relief valving mechanisms which, in the event of a fire, will allow the gas to escape from the cylinder before reaching an unacceptably high pressure. This reduces the potential for an explosion.

Several approaches have been used to produce acceptable thermally activated relief valves. For example, one approach has been to incorporate a fusible plug of a eutectic metal that blocks and seals an outlet passage in the pressure vessel. Once the temperature surrounding the vessel reaches the yield point of the eutectic metal, the plug melts and opens a controlled escape path for the gas in the vessel.

A major problem arises, however, in that essentially all commercially available eutectic metals, when exposed to high pressures, tend to extrude (creep or cold flow) over time and produce a potential gas leak path. For that reason, conventional fusible plug type devices are not recommended for uses in which the eutectic metal alloy is exposed to container pressures in excess of 500 psig. However, compressed natural gas fuel tanks can have pressures of up to 4500 psig, if a 3600 psig nominal working pressure system is subject to a temperature compensated fill to 1.25 times "settled pressure". Standards adopted by the Compressed Gas Association for Type CG-9 pressure relief devices used in CNG powered vehicles require that no visible extrusion of the fusible metal occur after 26,000 cycles between 300 psig and 70% of the fuel tank test pressure when tested at 180° F. and further that no visible extrusion occur after 500 hours of exposure to 70% of the tank test pressure when tested at 180° F.

Several approaches have been used in attempts to meet these stringent standards. Visnic, U.S. Pat. No. 4,800,948 and Visnic et al, U.S. Pat. Nos. 4,744,382 and 4,744,383 all teach thermally activated pressure relief devices which use arduous flow paths to prevent extrusion of the fusible plug material. Wass et al, U.S. Pat. No. 5,197,671, teach a pressure relief valve with a thermal trigger which includes a eutectic metal alloy and which engages a seal plug. When a predetermined temperature is exceeded, the trigger releases the seal plug to open a gas flow path. Ervin et al, U.S. Pat. No. 5,255,809, teach a different approach for a pressure relief device; rather than the use of a fusible plug, Ervin et al use a memory metal which changes its shape and opens a valve in response to temperature changes.

However, there remains a need in this art for thermally activated relief devices which will reliably activate to prevent a catastrophic pressure rupture of a pressure vessel and yet not develop an extrusion-related failure due to extrusion of a fusible alloy.

SUMMARY OF THE INVENTION

The present invention meets that need by providing a thermally activated relief device which resists extrusion-related failures even at high pressures and yet reliably activates to relieve pressure in a vessel and to prevent a catastrophic pressure rupture of a vessel. In accordance with one aspect of the present invention, a thermally activated relief device is provided and includes a body having an inlet, an outlet, and a fluid flow passage communicating with the inlet and outlet. The body further includes a fluid escape passage having a member therein which is porous to gases and liquids but not to solids; that is, the member will permit the passage of gases and liquids therethrough, but not solid materials. A plug of a fusible material which melts at a predetermined temperature is positioned adjacent to the porous member in the fluid escape passage.

A piston is positioned in the fluid flow passage, the piston having first and second ends, with the first end including a seal and the second end abutting the plug. The piston is normally biased into a sealing relationship with the inlet and applies a compressive force on the plug. In a preferred embodiment of the invention, the piston is biased by a spring into a closed and sealed position with the inlet to the device.

To reduce the pressure loading on the plug, the first end of the piston may be designed to have a smaller surface area than the second end. In this manner, the pressure in a vessel into which the device has been mounted will act on the smaller surface area of the first end of the piston.

The porous member is preferably comprised of a material which provides a tortuous flow path or paths for a fluid. In a preferred embodiment, the porous member is comprised of a sintered metal such as bronze. The sintered metal member may be fabricated by compressing together multiple small spheres of metal and sintering them together into a unitary member, with the spaces between spheres providing multiple flow paths. Such a material resists extrusion of the solid fusible material therethrough.

The thermally activated relief device of the present invention is adaptable to be used with essentially any pressure vessel by mounting it into an opening in the vessel. However, in a preferred embodiment of the invention, the thermally activated device is integrated into a bidirectional valve for controlling the flow of a compressed gas to and from a pressurized vessel such as a compressed natural gas containing fuel cylinder for a CNG powered vehicle. In this embodiment, the thermally activated device functions to prevent the fuel cylinder from rupturing by relieving excessive gas pressure in the cylinder, such as in the event of a fire.

In operation, the fusible alloy plug is compressed between the piston and porous member in the fluid escape passage. If the temperature exceeds a predetermined threshold, the plug material will melt and, due to the compressive force exerted by the piston, will flow through the porous member and fluid escape passage out of the device. As the plug material flows, the piston moves into the space previously occupied by the plug. When the opposite end of the piston clears the inlet on the device, the fluid flow passage through the device is opened and gas flows therethrough, relieving any pressure buildup.

Accordingly, it is a feature of the present invention to provide a thermally activated relief device which resists extrusion-related failures even at high pressures and yet reliably activates to relieve pressure in a vessel and to prevent a catastrophic pressure rupture of a vessel. This, and other features and advantages of the present invention, will

DETAILED DESCRIPTION OF THE PREFERRED EMBODIMENTS

Figure 1:
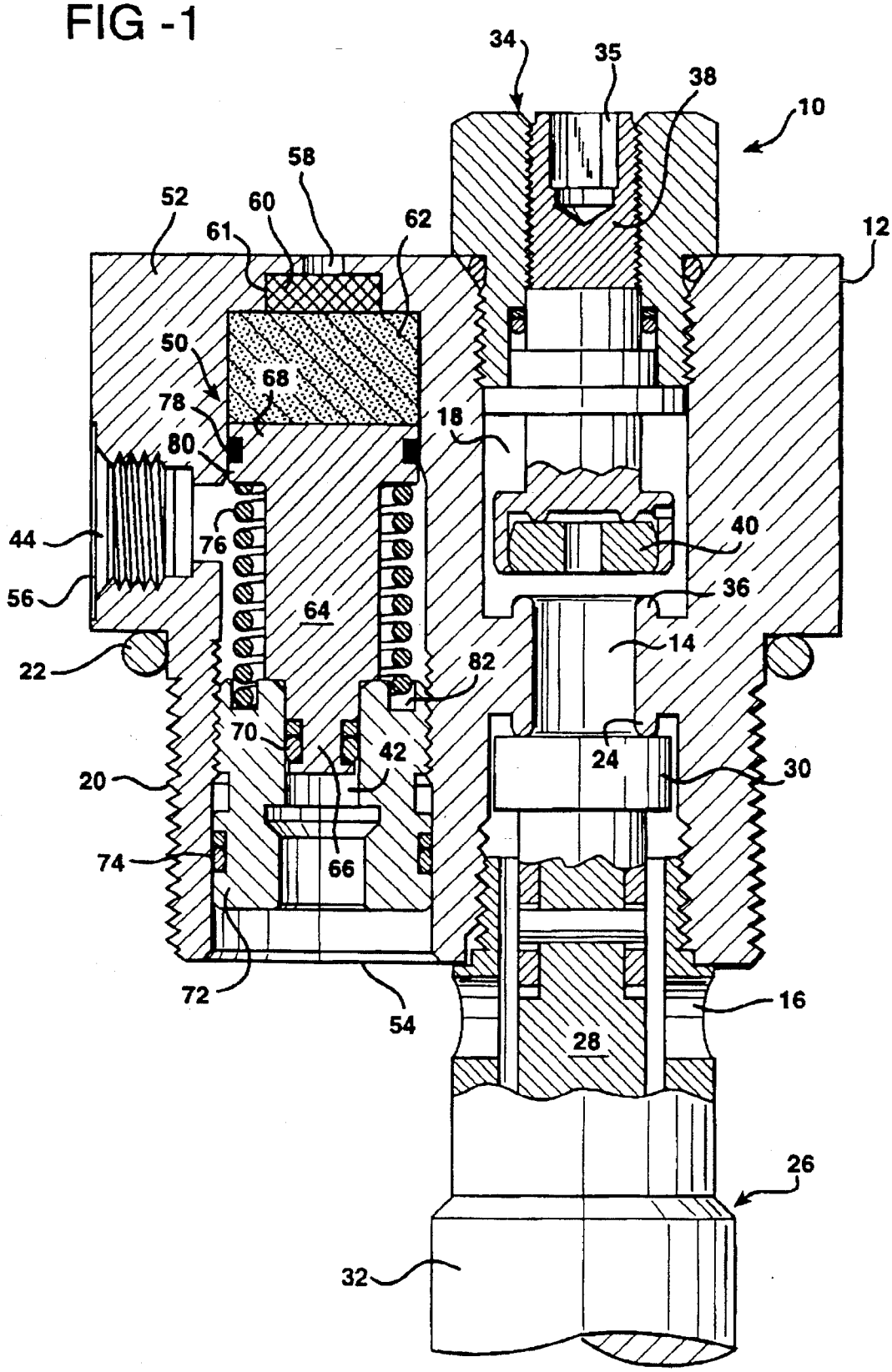
FIG. 1 is a side view, partially in cross-section, of the pressure relief device of the present invention configured with a solenoid valve.

While it will be apparent to those skilled in the art that the thermally activated relief device of the present invention may be adapted for use with essentially any pressure vessel where there is a need for pressure relief, including both gas and liquid-filled vessels, the invention will be explained in terms of several preferred embodiments of the invention. One of those embodiments is illustrated in FIG. 1 which shows a bidirectional valve 10 which includes a valve body 12 which has a first gas flow passage 14 which extends through the valve body from a first end 16 which communicates with the interior of a pressurized vessel (not shown) to a second end 18 which communicates with outlet ports (not shown) on the valve body. Valve body 12 includes external threads 20 which permits the valve to be screwed into a corresponding set of threads on a neck of the pressurized vessel. A resilient O-ring 22 provides for sealing between valve body 12 and pressurized vessel. Valve 10, and its component parts, may be fabricated of brass, steel, stainless steel, or aluminum, and may include plating or other surface treatment to resist corrosion.

In gas flow passage 14 is valve seat 24. Also positioned in gas flow passage 14 is solenoid valve 26 which includes a plunger 28, popper head 30, and housing 32. Plunger 28 and poppet head 30 are slidable in gas flow passage 14. A spring (not shown) normally biases popper head 30 into a sealing relationship with valve seat 24. A solenoid coil (not shown), when actuated, causes plunger 28 to move away from poppet head 30, thereby permitting the valve seat to open as is explained in greater detail in commonly-assigned U.S. patent application Ser. No. 08/200,075, filed Feb. 22, 1994, the disclosure of which is incorporated by reference herein.

Referring again to FIG. 1, bidirectional valve 10 also includes an optional manual lockdown valve 34 which is positioned in gas flow passage 14 between valve seat 24 and the second end 18 of the flow passage. Manual lockdown valve 34 permits pressure testing of the valve and fuel supply system to insure that they are leak tight under a range of normal operating pressures of up to about 3600 psi. Manual lockdown valve 34 can be tightened using a tool such as an Allen wrench (not shown) in socket 35 to seal against a second valve seat 36 in gas flow passage 14. As shown, the threaded stem 38 may be rotated to tighten resilient gasket 40 against valve seat 36 to seal gas flow passage 14.

Still referring to FIG. 1, valve body 12 also includes a second gas flow passage 42 which communicates at one end with the interior of the pressurized vessel and at the other end communicates with a gas vent port 44 on the valve body. The thermally activated relief device, generally indicated at 50, of the present invention is mounted in second gas flow passage 42. Relief device 50 includes a body 52 having an inlet 54 and an outlet 56. Second gas flow passage 42 communicates between inlet 54 and outlet 56. Body 52 may be made from any suitable metal such as, for example, brass.

Body 52 includes a fluid escape passage 58 which permits gas from the pressurized cylinder to escape under conditions as explained in greater detail below. Blocking fluid escape passage 58 is member 60 which is porous to gases and liquids, but not solids. As shown, member 60 may be seated in a cut out shoulder area 61 in body 52. Preferably, member 60 is comprised of a sintered metal such as bronze. The sintered bronze may take the form of multiple small diameter spheres which have been sintered together to form a single body. The spaces between the spheres form numerous fluid flow passages, but resist the passage of solids because of the small area of the passages and their many changes in direction. It will be appreciated by those skilled in the art that member 60 may take a number of forms and can be made of any material which has the characteristics of being porous to gases and liquids, but which is not porous to solids and which includes numerous small flow passages, preferably providing tortuous flow paths.

As shown in FIG. 1, thermally activated relief device 50 also includes a plug 62 of a fusible material, preferably a fusible metal eutectic alloy having a melting point of 217° F. Such fusible alloys and their melting points are well known in the art. Different eutectic alloys may be chosen depending on the desired temperature at which the relief device is designed to open. Plug 62 is positioned adjacent porous member 60 and out of the second gas flow passage 42. Plug 62 is held in place adjacent member 60 by a piston 64 positioned in gas flow passage 42. Piston 64 is preferably made of stainless steel.

Piston 64 has first end 66 and second end 68, with first end 66 having a smaller surface area as shown than second end 68. By manufacturing piston 64 in this manner, the force acting on fusible plug 62 is reduced to lessen any tendency of the plug alloy to extrude through creep or cold flow. Thus, if the first end 66 of piston 64 has a diameter D1, second end 68 had a diameter D2, and D1<D2, then the compressive stress placed on plug 62 will be equal to the tank pressure multiplied by $\pi/4 \times (D1/D2)^2$.

As also shown in FIG. 1, first end 66 of piston 64 has a seal 70, such as an O-ring and backup ring pair, to seal against retaining nut 72, made of a suitable metal such as brass. As shown, retaining nut 72 itself includes an O-ring—backup ring pair 74, to seal against body 52. Preferably, the O-ring—backup ring pair are fabricated of a nitrile rubber, Viton (trademark), or other suitable material designed for low temperature resiliency. Second end 68 of piston 64 also includes an O-ring seal 78 to form a secondary seal to insure that no gas leaks around the piston.

Spring 76 insures that relief device 50 will function even when there is very low or no pressure in the vessel. That is, spring 76 exerts a sufficient force against plug 62 so that in the event the temperature around the device exceeds the predetermined melting temperature of the plug material, the melted material will be forced through passage 58 and permit flow passage 42 to open. Further, while a coiled spring is depicted, it will be appreciated by those skilled in the the art that other equivalent mechanical devices may be used to bias piston 64 against plug 62.

Figure 4:
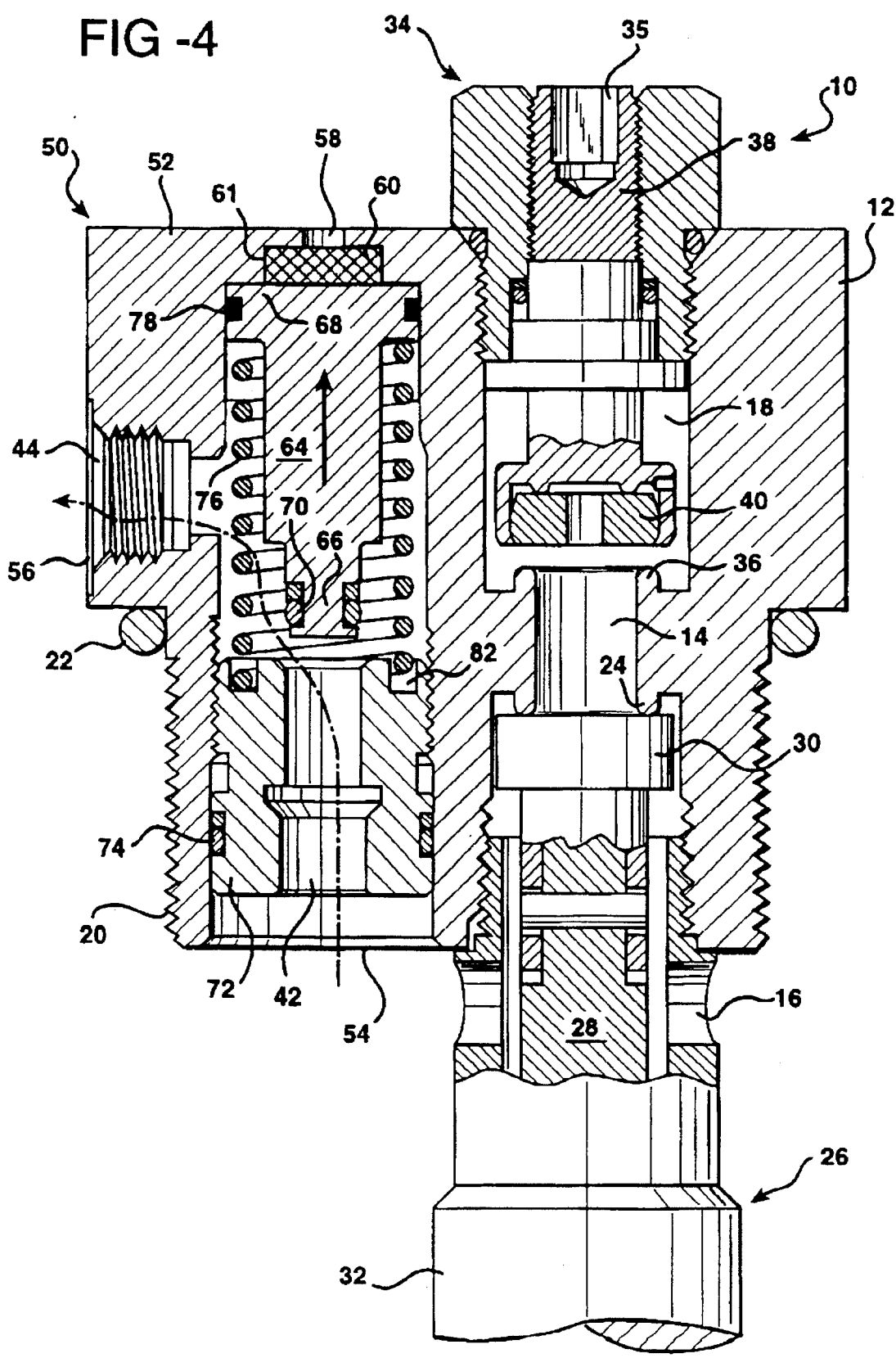
FIG. 4 is a side view, partially in cross-section, of the relief device after activation in which the fusible metal alloy plug has melted and the spring-loaded piston has been displaced into the space formerly occupied by the plug.

During normal operation of bidirectional valve 10, relief device 50 maintains a gas tight seal. If, however, the temperature adjacent the valve body or pressurized vessel rises above a predetermined limit, fusible plug 62 melts and flows through porous member 60 and out escape passage 58. As best shown in FIG. 4, the combination of the compressive force on spring 76 acting on shoulder 80 and the force due to tank pressure acting on the area of the first end 66 of piston 64 causes piston 64 to move in the direction of the arrow. This movement of piston 64 opens second gas flow passage 42 and permits the pressurized gas in the vessel to vent to the exterior through port 44.

Figure 2:
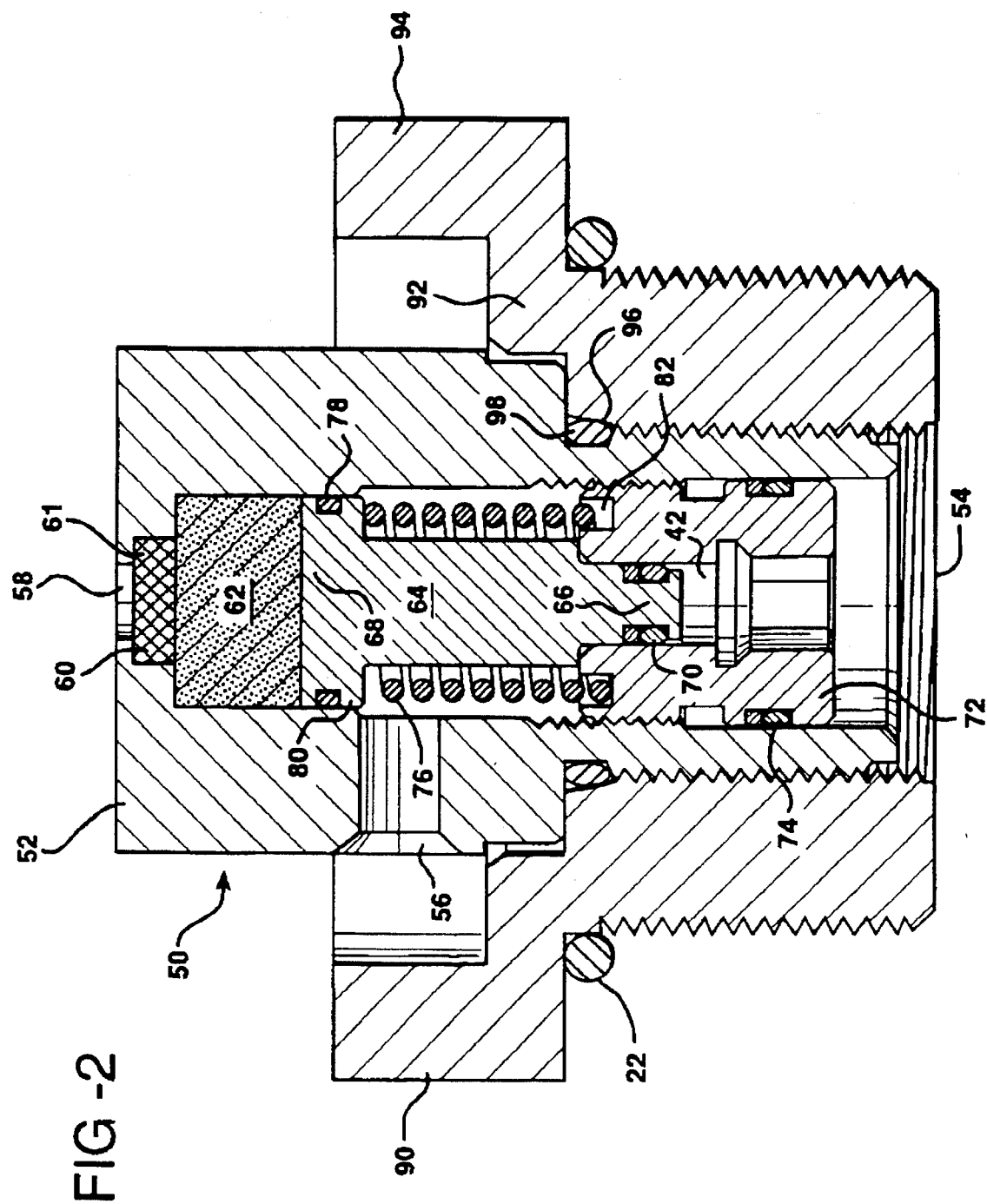
FIG. 2 is a side view, in cross-section, of another embodiment of the invention adapted to be mounted directly to a pressure vessel.

Another embodiment of the thermally activated relief device is shown in FIG. 2, where like reference numerals represent like elements. In this embodiment of the invention, relief device 50 may be sealed directly into any container for a pressurized fluid. As shown, relief device 50 is sealed into a cap 90 which is itself adapted to be screwed into an opening in a container (not shown). Cap 90 includes an annular threaded opening into which the corresponding threads on the body 52 of relief device 50 may be assembled.

As shown, O-ring 22 provides a sealing surface between cap 90 and the container (not shown), while cap 90 includes a chamfered surface 96 for O-ring 98 to reside and provide a seal between body 52 and cap 90. Cap 90 also includes a generally horizontally extending flange 92 and a generally upstanding lip 94 to create a space around gas outlet 56 which permits fluid to escape through outlet 56 as previously explained.

Figure 3:
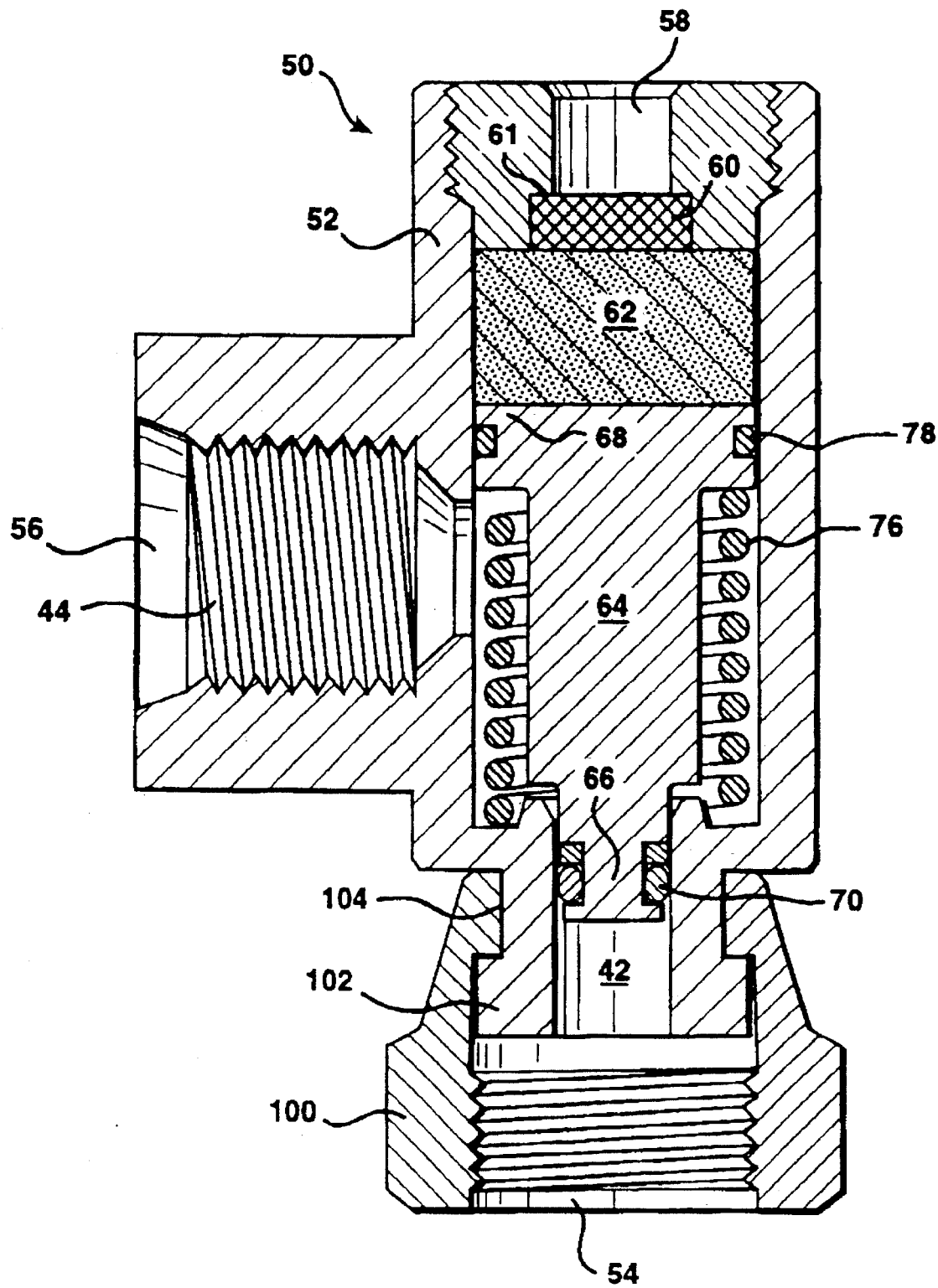
FIG. 3 is a side view, in cross-section, of another embodiment of the invention which has a swivel connector at the inlet side.

FIG. 3 shows yet another embodiment of the invention where relief device 50 may be externally mounted on a container through a swivel connector 100. As shown, body 52 includes a flange portion 102 over which the lip 104 of swivel connector 100 is fitted. Relief device 50 is then free to rotate a full 360° to provide easy connections, for example, for vent port 44.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A thermally activated relief device comprising:
    a body having an inlet, an outlet, and a fluid flow passage communicating with said inlet and outlet;
    said body further including a fluid escape passage having a member therein comprised of a sintered metal which is porous to gases and liquids but not to solids;
    a plug of a fusible material which melts at a predetermined temperature adjacent to said member; and
    a piston positioned in said fluid flow passage having first and second ends, said first end of said piston being normally biased into a sealing relationship with said inlet and said second end abutting and applying a compressive force on said plug.

2. A thermally activated relief device as claimed in claim 1 in which said first end of said piston has a smaller surface area than said second end.

3. A thermally activated relief device as claimed in claim 1 in which said piston is biased by a spring.

4. A thermally activated relief device as claimed in claim 1 in which said sintered metal is comprised of spheres which have been sintered together.

5. A thermally activated relief device as claimed in claim 1 in which said sintered metal is bronze.

6. A thermally activated relief device as claimed in claim 1 in which said plug is not in said fluid flow passage.

7. A thermally activated relief device as claimed in claim 1 including a swivel fitting over said inlet.

8. A thermally activated relief device as claimed in claim 1 in which said body includes a shoulder adjacent said fluid escape passage and said member is fitted into said shoulder.

9. In combination, a pressurized vessel having an opening therein and a thermally activated relief device mounted in said opening for releasing gas from said pressurized vessel when the temperature adjacent said vessel exceeds a predetermined threshold, said thermally activated relief device comprising:
    a body having an inlet, an outlet, and a fluid flow passage communicating with said inlet and outlet;
    said body further including a fluid escape passage having a member therein comprised of a sintered metal which is porous to gases and liquids but not to solids;
    a plug of a fusible material which melts at a predetermined temperature adjacent to said member; and
    a piston positioned in said fluid flow passage having first and second ends, said first end of said piston being normally biased into a sealing relationship with said inlet and said second end abutting and applying a compressive force on said plug.

10. A pressurized vessel and thermally activated relief device as claimed in claim 9 in which said first end of said piston has a smaller surface area than said second end.

11. A pressurized vessel and thermally activated relief device as claimed in claim 9 in which said piston is biased by a spring.

12. A pressurized vessel and thermally activated relief device as claimed in claim 9 in which said sintered metal is comprised of spheres which have been sintered together.

13. A pressurized vessel and thermally activated relief device as claimed in claim 9 in which said sintered metal is bronze.

14. A pressurized vessel and thermally activated relief device as claimed in claim 9 in which said plug is not in said fluid flow channel.

15. A thermally activated relief device comprising:
    a body having an inlet, an outlet, and a fluid flow passage communicating with said inlet and outlet;
    said body further including a fluid escape passage having a member therein which is porous to gases and liquids but not to solids and includes numerous small flow passages providing tortuous flow paths for a fluid;
    a plug of a fusible material which melts at a predetermined temperature adjacent to said member; and
    a piston positioned in said fluid flow passage having first and second ends, said first end of said piston being normally biased into a sealing relationship with said inlet and said second end abutting and applying a compressive force on said plug.

* * * * *